(12) United States Patent
Gonzalez

(10) Patent No.: US 8,702,446 B2
(45) Date of Patent: Apr. 22, 2014

(54) DEVICES FOR MOUNTING ELECTRICAL, AUDIO, AND VIDEO INSTALLATIONS TO WALLS AND OTHER FLAT SURFACES

(76) Inventor: Jair Gonzalez, New York, NY (US)

(*) Notice: Subject to any disclaimer, the term of this patent is extended or adjusted under 35 U.S.C. 154(b) by 157 days.

(21) Appl. No.: 13/225,416

(22) Filed: Sep. 3, 2011

(65) Prior Publication Data
US 2012/0122338 A1    May 17, 2012

Related U.S. Application Data

(63) Continuation-in-part of application No. 12/424,530, filed on Apr. 15, 2009, now abandoned.

(51) Int. Cl.
*H01R 13/60* (2006.01)
(52) U.S. Cl.
USPC ............................................. 439/535
(58) Field of Classification Search
USPC ................................. 439/535–536
See application file for complete search history.

(56) References Cited

U.S. PATENT DOCUMENTS

| | | | | |
|---|---|---|---|---|
| 1,952,719 A * | 3/1934 | Lewin | ............... | 220/3.8 |
| 3,437,738 A * | 4/1969 | Wagner | ............... | 174/55 |
| 4,265,365 A * | 5/1981 | Boteler | ............... | 220/3.3 |
| 7,304,236 B1 * | 12/2007 | Gretz et al. | ............... | 174/58 |
| 7,319,192 B1 * | 1/2008 | Gretz et al. | ............... | 174/58 |

* cited by examiner

*Primary Examiner* — Xuong Chung Trans

(57) ABSTRACT

Devices in the form of flush-mounting plates are disclosed which are adapted to connect, for example, one or more receptacles to an electrical box that is disposed inside of a wall. Such flush-mounting plates include a back side that is adapted to be connected to the electrical box through a set of screws disposed through corresponding apertures located in the flush-mounting plate and electrical box, and a front side that is adapted to be connected to the one or more receptacles and a cover plate having a planar exterior surface. The one or more receptacles are positioned between the flush-mounting plate and the cover plate, such that the cover plate, one or more receptacles, and flush-mounting plate are connected to the electrical box in a manner that the exterior surface of the cover plate is substantially flush with an outer wall that surrounds the electrical box.

10 Claims, 19 Drawing Sheets

DEVICES FOR MOUNTING ELECTRICAL, AUDIO, AND VIDEO INSTALLATIONS TO WALLS AND OTHER FLAT SURFACES

CROSS-REFERENCE TO RELATED APPLICATIONS

This application is a continuation-in-part application of U.S. patent application Ser. No. 12/424,530, filed Apr. 15, 2009.

FIELD OF THE INVENTION

The present invention relates generally to the field of functional components, control devices and methods for mounting electrical, audio, video and low-voltage device installations to walls and other flat surfaces.

BACKGROUND OF THE INVENTION

It is commonplace for walls, ceilings, and floors to include electrical outlets, switches, communication and data ports (e.g., for telephone and cable lines), thermostats, and other types of receptacles and low-voltage devices. Almost any home or office building today will include, for example, electrical outlets and switches that include an electrical box located within the interior of the wall that supports and is connected to a mounting base (e.g., currently referred to as a "mud ring") to which the electrical outlet or switch may be attached (and then covered by or joined to a cover plate).

The currently-available outlet assemblies, for example, suffer from several drawbacks. Specifically, the holes that are cut into a wall, and the mounting base that is connected to the electrical box (or so-called "1900 box"), are configured to only be capable of receiving a receptacle that is configured to the size of the mounting base. That is, for example, the currently-available outlet assemblies are designed such that a wall may not be easily modified to replace an outlet having two receptacles with an outlet having a single receptacle (or an outlet having four receptacles with an outlet having two receptacles), without having to damage and/or repair the surrounding wall area and replace the mounting base.

Furthermore, the installation of the mounting base restricts the space, which is not sufficient to allow an electrical inspector, during the construction of a new home or building, to conduct an appropriate electrical inspection (as required by local and/or state laws and regulations) or allow for proper wiring of the device. As such, the electrical inspections must take place before the dry wall is installed, which often leads to delays in the construction process. In addition, because of the spatial limitations created by conventional mounting bases, the electrical wiring must be "pulled" before the mounting base is installed into the wall (and before the dry wall is erected)—which may also contribute to construction delays.

Still further, the currently-available outlet assemblies are configured in such a way that the cover plate protrudes outward from the surface of the surrounding wall. Typical assemblies use the wall to create stability between the outlet, the mounting trim and the cover plate, which results in the protrusion of current cover plates. This sometimes leads to damaged cover plates and, moreover, does not allow for a modification to the cover plate (or the perimeter thereof) in a way that creates a more seamless transition and integrated appearance between the wall and the cover plate.

As the following will demonstrate, many of the foregoing problems with currently-available outlet assemblies are addressed by the present invention. Indeed, among the various novel aspects of the present invention, a new flush-mounting plate is provided, as described herein, which represents a dramatic improvement over and replacement of conventional mounting bases. The new flush-mounting plate that is shown and described herein may be used to install electrical outlet assemblies, as mentioned above, as well as switches, communication and data ports (e.g., for telephone and cable lines), thermostats, and a variety of other types of receptacles and low-voltage devices that are seamless and integrated in appearance with the wall.

SUMMARY OF THE INVENTION

According to certain aspects of the invention, outlet assemblies are provided, which include a cover plate having a planar exterior surface, one or more receptacles, a flush-mounting plate (as described herein), and an electrical box. The invention provides that the cover plate is connected to the front portion of the flush-mounting plate, with the one or more receptacles disposed between the cover plate and flush-mounting plate, and the flush-mounting plate is connected to the electrical box. The cover plate, one or more receptacles, and flush-mounting plate are installed into the electrical box such that the exterior surface of the cover plate is preferably flush, or substantially flush, with the outer wall that surrounds the electrical box. According to certain preferred embodiments of the invention, the flush-mounting plate is adapted to interchangeably be connected to a variety of different receptacle types. More particularly, for example, the invention provides that the flush-mounting plate is configured such that, when the flush-mounting plate is attached to an electrical box (e.g., a two-gang electrical box) within a wall, the outlet assembly may be adapted to effectively replace two receptacles with a single receptacle (i.e., make a single receptacle available to a user instead of two), without removing the connected flush-mounting plate or damaging (or repairing) the portion of the wall immediately surrounding the flush-mounting plate.

According to additional aspects of the invention, a novel flush-mounting plate is provided, as described above. More particularly, according to certain preferred embodiments, the flush-mounting plate comprises a front portion that is adapted to be connected to a cover plate having a planar exterior surface, with at least one receptacle disposed between the flush-mounting plate and the cover plate. The flush-mounting plate further comprises a back portion that is adapted to be connected to an electrical box. As explained above, the invention provides that upon installation of the cover plate, receptacle, and flush-mounting plate to the electrical box, the exterior surface of the cover plate is flush, or substantially flush, with an outer wall that surrounds the electrical box. The invention further provides that the flush-mounting plate will, preferably, comprise an outer perimeter having a recessed area located within such outer perimeter. The recessed area is preferably adapted to receive and be connected to the at least one receptacle. In addition, according to certain preferred embodiments, the recessed area of the flush-mounting plate may comprise a plurality of apertures, such as three apertures, located in each of a top portion and a bottom portion thereof. For example, the recessed area may be provided with at least three apertures that are spaced an equal distance apart, and are adapted to receive a set of screws that may connect a variety of different receptacle types to the flush-mounting plate. For example, as described in greater detail below and by way of illustration only, the apertures may be located within the recessed area of the flush-mounting plate in such a way that the associated outlet assembly may be adapted to effectively replace two receptacles with a single receptacle (i.e., make a single receptacle available to a user instead of two), without removing the flush-mounting plate from the electrical box or damaging the portion of the wall immediately surrounding the flush-mounting plate.

According to other related aspects of the invention, methods for installing an outlet assembly in a wall are provided. More particularly, such methods comprise the steps of cutting a hole in a wall that exhibits approximately the same outer dimension as the outer dimension of the flush-mounting plate described herein. The methods further include connecting the flush-mounting plate described herein to the electrical box (disposed within the wall), and then connecting the cover plate (which preferably exhibits a planar exterior surface) and a receptacle to the flush-mounting plate. As explained above, the cover plate, receptacle, and flush-mounting plate are preferably installed into the electrical box in such a manner that the exterior surface of the cover plate is flush, or substantially flush, with an outer surface of the wall that surrounds the electrical box. The invention provides that the foregoing method will allow an electrical inspector to conduct an electrical inspection of the wires and electrical box, even after the surrounding wall has been erected. More particularly, the present invention will allow an electrician to install the flush-mounting plate, and terminate and install the outlet (receptacle) after the dry wall has been erected—and allow an electrical inspector to perform an inspection thereafter, without damaging the dry wall or causing any delays in the construction process.

The above-mentioned and additional features of the present invention are further illustrated in the Detailed Description contained herein.

DETAILED DESCRIPTION OF THE INVENTION

Figure 1:
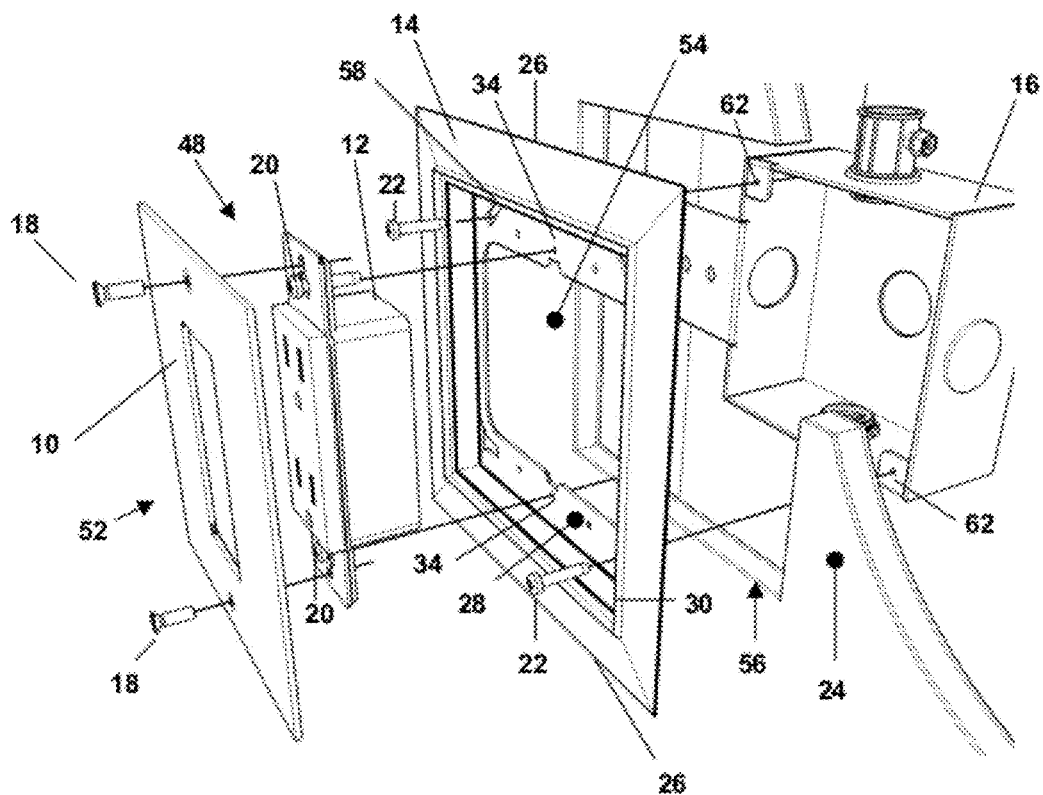
FIG. 1: A perspective, disassembled view of an outlet assembly of the present invention, which shows a single receptacle being attached to the flush-mounting plate.

The following will describe in detail several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

In its broadest sense, the present invention encompasses a device that may be used to mount electrical, audio, and video installations to walls and other flat surfaces, which is sometimes referred to herein as a "flush-mounting plate." As described further below, in general, the flush-mounting plate comprises a plate with two primary sides (a front side and a back side) and an open middle portion. The back side of the flush-mounting plate may be affixed to an electrical box located inside of a wall, with the front side adapted to receive, for example, (1) one or more receptacles (or other devices, such as an electrical switch, communication or data port (e.g., for telephone and cable lines), thermostat, or a variety of other types of receptacles and low-voltage devices) and, in some cases, (2) a cover plate that surrounds the one or more receptacles, switches, or low-voltage device. Preferably, the invention provides that when the flush-mounting plate is affixed to an electrical box located inside a wall, along with the one or more receptacles, switches, etc., the surrounding cover plate will be flush, or substantially flush, with the surrounding wall surface.

As described further below, the present invention encompasses various forms of the flush-mounting plate, including a first type that may be connected to a cover plate through mechanical screws, and a second type that may be connected to a cover plate through magnets. As shown and described further below, both types of flush-mounting plates exhibit additional variations as well.

Device with Screw-Mounted Faceplate

Referring to FIGS. 1-8, according to certain preferred embodiments of the present invention, outlet assemblies are provided that include a cover plate 10 having a planar exterior surface, i.e., the visible surface of the cover plate 10 which faces the interior of a room. The assemblies further comprise one or more receptacles 12, a flush-mounting plate 14, and an electrical box 16. A certain type of electrical box 16 is also commonly referred to as a "1900 box" in the field. The electrical box 16 will preferably be attached to a stud within a wall, such that the front plane of the electrical box 16 is flush (or approximately flush) with the front plane of the stud. Preferably, there will be at least a half-inch space between the front plane of the electrical box 16 and the front plane of the dry wall. As used herein, the terms "receptacle" and "receptacles" refer to any of a variety of devices (in any vertical or horizontal configuration) that are commonly disposed within a wall or ceiling and are connected to an electrical box 16, such as electrical outlets (including, but not limited to, outlets that may be disposed in one-gang, two-gang, three-gang, four-gang, five-gang, or six-gang electrical boxes), electrical switches, cable jacks, thermostats, communication and data ports, or even a blank plate.

Figure 2:
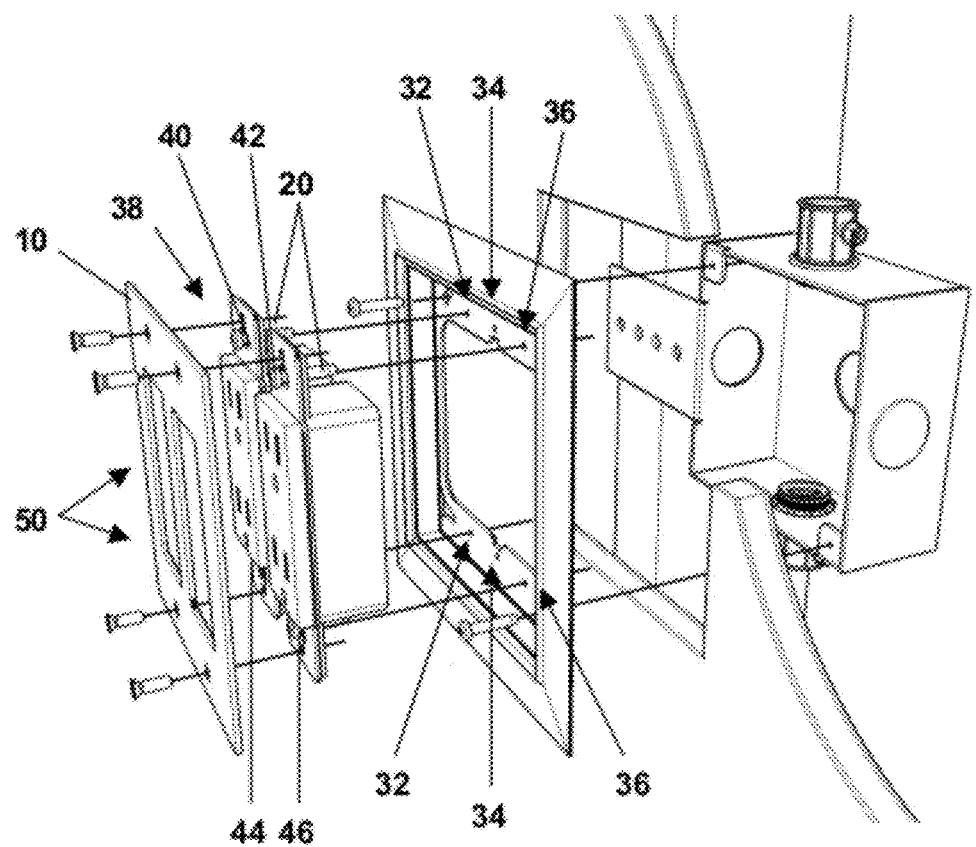
FIG. 2: A perspective, disassembled view of the outlet assembly of FIG. 1, which shows two receptacles being attached to the flush-mounting plate.
Figure 3:
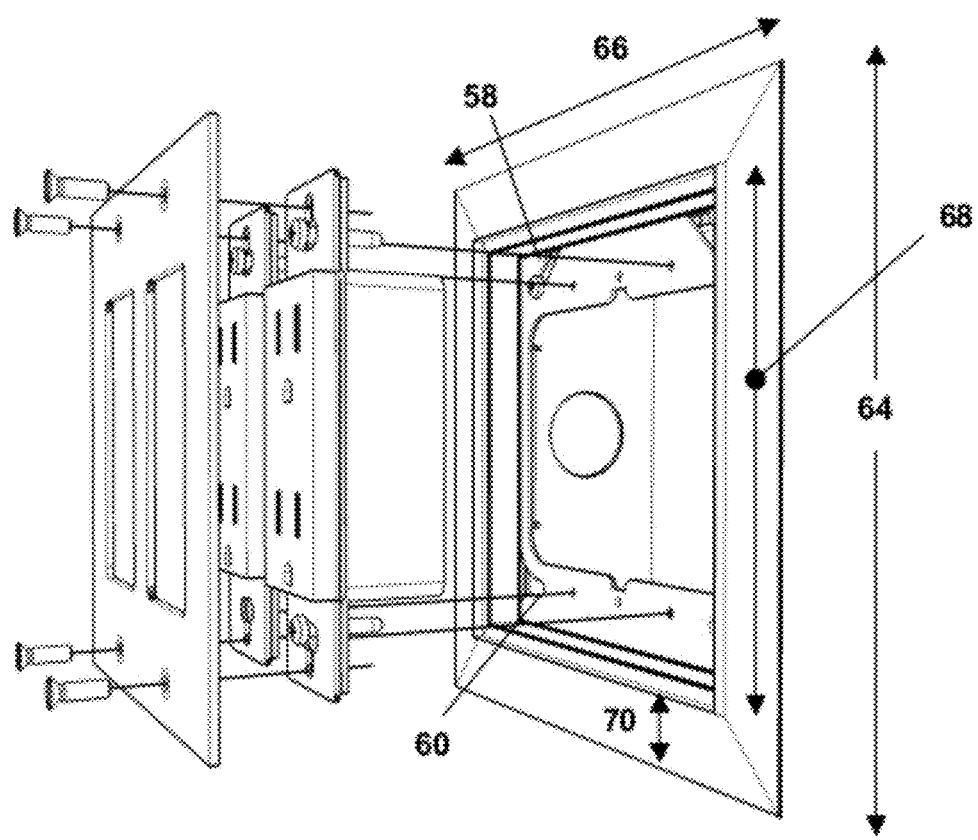
FIG. 3: Another perspective view of the outlet assembly of FIG. 2, which shows the flush-mounting plate connected to an underlying electrical box.

As illustrated in FIGS. 1-3, the invention provides that the cover plate 10 is connected to the front side of the flush-mounting plate 14, with the one or more receptacles 12 disposed between the cover plate 10 and flush-mounting plate 14. The invention provides that the flush-mounting plate 14 (or, more particularly, the back side thereof) is connected to the electrical box 16. Referring to FIG. 1, in this embodiment, the invention provides that the cover plate 10 may be connected to the one or more receptacles 12 vis-à-vis a set of screws 18, which are disposed through corresponding apertures located in the top and bottom portions of the cover plate 10 and the receptacle 12. However, the invention provides that the cover plate 10 may be connected to the one or more receptacles 12 vis-à-vis other mechanical means, such as tabs, snaps, pegs, adhesives, and the like. Similarly, the receptacle 12 may be connected to the flush-mounting plate 14 vis-à-vis a set of screws 20 (or other mechanical means), which are disposed through corresponding apertures located in the top and bottom portions of the receptacle 12 and the flush-mounting plate 14. Still further, the invention provides that the flush-mounting plate 14 may be connected to the electrical box 16 vis-à-vis a set of screws 22 (or other mechanical means), which are disposed through corresponding apertures located in the top and bottom portions of the flush-mounting plate 14 and the electrical box 16. The invention provides that the flush-mounting plate 14 will comprise an outer perimeter 26, which may be tapered and include an inner edge portion 30. The invention provides that the inner edge portion 30 will preferably surround a recessed area 28 (located in the front portion of the flush-mounting plate 14), with the recessed area 28 being provided with a set of apertures and adapted to receive and be connected to the receptacle 12, as described herein. The flush-mounting plate 14 will further comprise a window area (open middle portion) 54 that will allow wires originating from the electrical box 16 to travel through the flush-mounting plate 14 and be operably connected with the backside of the receptacle 12.

The dimensions of the flush-mounting plate 14 may vary to accommodate the size of the electrical box 16. For example, and referring to FIG. 3, the flush-mounting plate 14 may be square in shape, and have a height 64 of about 6 inches, and a width 66 of about 6 inches. The tapered outer perimeter 26 may exhibit a height 70 of about 23/32 of an inch. The inner edge portion 30 of the outer perimeter 26 may exhibit a height 68 (and width) of about 4 and 9/16 inches. Still further, according to certain non-limiting examples of the flush-mounting plate 14 described herein, the flush-mounting plate 14 may be provided with at least three apertures 32,34,36 located in each of a top portion and a bottom portion of the recessed area 28 thereof (as discussed below), with the at least three apertures 32,34,36 spanning a collective length of about 1 and 13/16 inches (with the apertures of the top portion being located about 3 and 3/8 inches above the apertures of the bottom portion of the recessed area 28). In addition, according to such example, the window area 54 of the flush-mounting plate 14 may exhibit a height of 2 and 13/16 inches and a width of 3 and 13/16 inches. The foregoing dimensions are provided for illustration purposes only, as a flush-mounting plate 14 which has been shown to be compatible with a two-gang electrical box 16.

In certain preferred embodiments, the invention provides that the apertures located in the top and bottom portions of the flush-mounting plate 14, which are used to attach the flush-mounting plate 14 to the electrical box 16, will preferably comprise an area that may allow the orientation of the flush-mounting plate 14 to be adjusted, before the flush-mounting plate 14 is secured to the electrical box 16 using the screws 22 described herein. For example, referring to FIG. 3, the aperture 58 located in the top portion of the flush-mounting plate 14 exhibits a slanted column (area), relative to the sides of the flush-mounting plate 14, whereas the aperture 60 located in the bottom portion of the flush-mounting plate 14 exhibits a column (area) running perpendicular to the side of the flush-mounting plate 14. This configuration allows the flush-mounting plate 14 to be slightly turned left or right, until the topside of the flush-mounting plate 14 is desirably level, while still allowing the apertures 58,60 located in the top and bottom portions of the flush-mounting plate 14 to correspond with, and be connected to, the apertures 62 (FIG. 1) located in the electrical box 16. The invention provides that the apertures 58,60 located in the top and bottom portions of the flush-mounting plate 14 may be disposed on the left, right, and/or center portions thereof, so long as they correspond with the apertures 62 located in the electrical box 16. This design preferably allows the flush-mounting plate 14 to be mounted to a wall in a level fashion, even if the underlying electrical box 16 is not level (which is often the case).

The invention provides that certain of the apertures located in the cover plate 10, receptacle 12, flush-mounting plate 14, and electrical box 16 may be threaded, to reversibly and securely receive the applicable set of screws. For example, the apertures located in the top and bottom portion of the receptacle 12, which receive the set of screws 18 that connect the cover plate 10 to the receptacle 12, may be threaded. Likewise, the apertures located in the top and bottom portion of the flush-mounting plate 14, which receive the set of screws 20 that connect the receptacle 12 to the flush-mounting plate 14, may be threaded. Still further, the apertures 62 located in the top and bottom portion of the electrical box 16, which receive the set of screws 22 that connect the flush-mounting plate 14 to the electrical box 16, may be threaded. Although reference is made to such apertures being located in top and bottom portions of the cover plate 10, receptacle 12, flush-mounting plate 14, and electrical box 16 described herein, the invention provides that such apertures may, alternatively, be located within other portions of such components. For example, such apertures may be located in the side portions of such components. By way of illustration and not limitation, FIG. 1 depicts corresponding apertures being centered in the top and bottom portions of the cover plate 10 and receptacle 12, whereas the other corresponding apertures are shown to be located in the top-left and bottom-right corners of the flush-mounting plate 14 and electrical box 16.

According to certain preferred embodiments of the present invention, the cover plate 10, one or more receptacles 12, and flush-mounting plate 14 are installed into the electrical box 16 such that the exterior surface of the cover plate 10 is preferably flush with the outer wall 24 that surrounds the electrical box 16. As used herein, the term "flush" means that the surface of a first area, e.g., the exterior surface of the cover plate 10, is contiguous with the surface of a second area, e.g., the surface of a surrounding wall. In other words, the surface of the first area, e.g., the exterior surface of the cover plate 10, will not protrude from (or be recessed relative to) the surface of the second area, e.g., the surface of a surrounding wall. As used herein, the terms "substantially flush," "approximately flush," and similar terms mean that the surface of a first area, e.g., the exterior surface of the cover plate 10, is close to being contiguous with the surface of a second area, e.g., the surface of a surrounding wall. In other words, the terms "substantially flush," "approximately flush," and similar terms mean that the cover plate 10 will appear—to a casual observer—to exist within the same plane as the surface of the surrounding wall. Preferably, the exterior surface of the cover plate 10 will not protrude from (or be recessed relative to) the surface of the surrounding wall by more than a distance of 3/32 of an inch and, still more preferably, by no more than a distance of 1/16 inch of an inch. Such embodiments create a dramatically distinct appearance from various "prior art" assemblies which may claim to be "flush" with the surrounding wall, although the cover plates of such "prior art" assemblies often protrude from a wall surface by as much as 1/8 or 3/4 of an inch.

Figure 4:
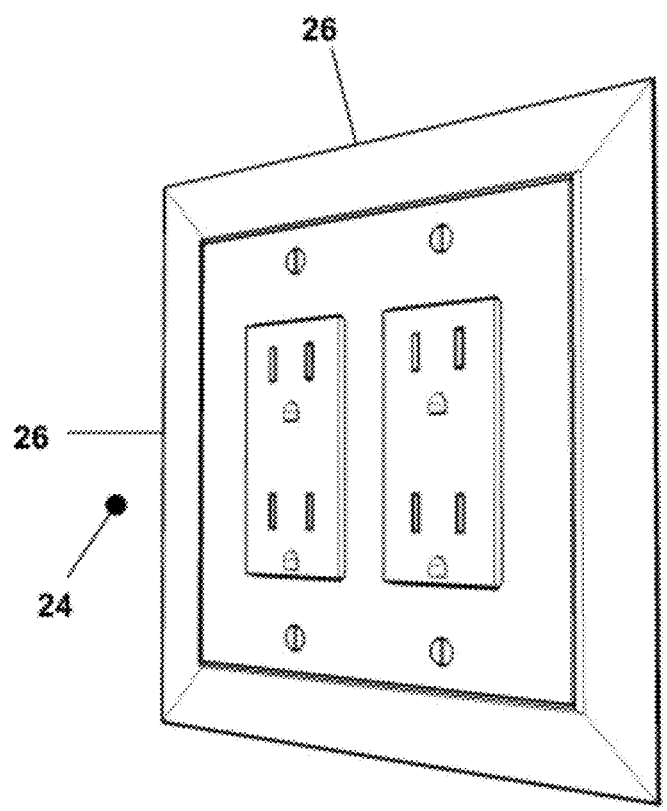
FIG. 4: A perspective, assembled view of an outlet assembly of the present invention.
Figure 5:
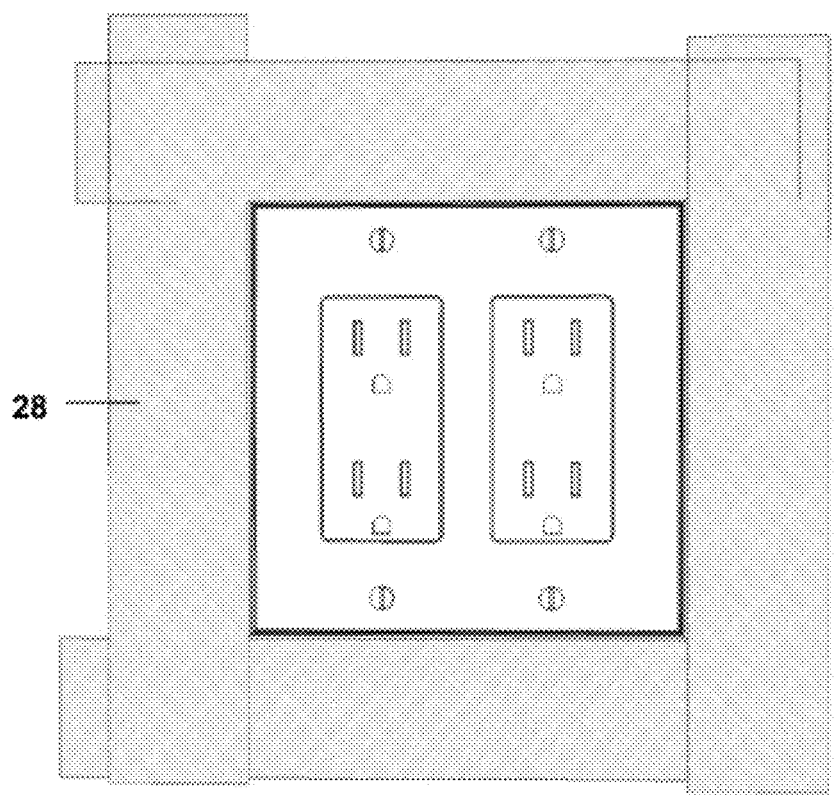
FIG. 5: A front, assembled view of an outlet assembly of the present invention, with the perimeter portion thereof covered in drywall tape.
Figure 6:
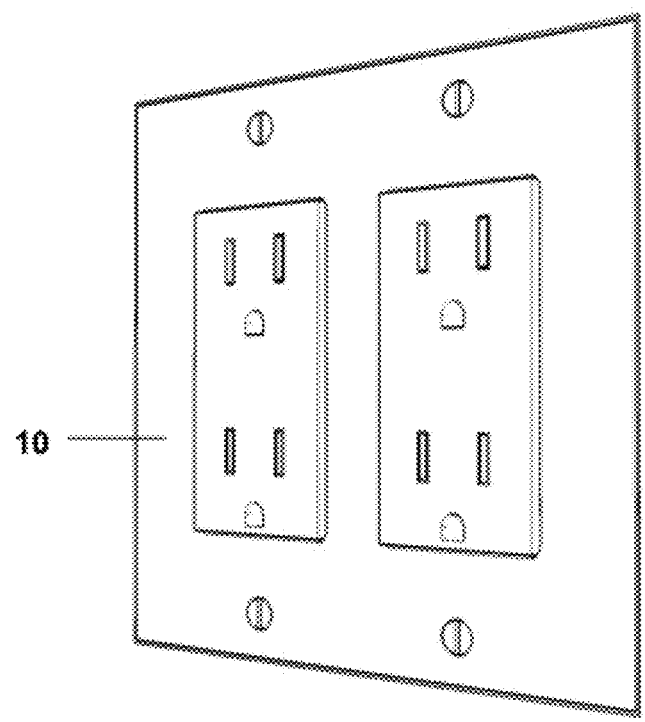
FIG. 6: A perspective, assembled view of the outlet assembly of FIG. 5, with the perimeter portion thereof covered in drywall tape, plastered, and painted.

A non-limiting example of the outlet assemblies described herein is illustrated in FIG. 4, showing the assembly being installed into the wall and the exterior surface of the cover plate 10 being flush (or substantially flush) with the outer wall 24 that surrounds the electrical box 16. In other words, when installed in the wall and connected to the one or more receptacles 12 and flush-mounting plate 14, the exterior surface of the cover plate 10 does not protrude outwards and away from the plane of the wall surface. Rather, the plane of the exterior surface of the cover plate 10 will be contiguous (or substantially contiguous) with the plane of the outer wall 24 that surrounds the electrical box 16. As such, referring to FIGS. 4-5, the invention provides that the seam, i.e., the transition point between the outer perimeter (peripheral edge) 26 of the flush-mounting plate 14 and the outer wall 24, may be covered with tape, plaster, paint, or a combination thereof 28. Accordingly, if the seam is taped and/or plastered, as illustrated in FIG. 5, the seam (including the tape and/or plaster covering the seam) may be painted to create an appearance whereby the outlet assembly is not only flush (or substantially flush) with the outer wall, but is also visually seamless with the outer wall. The outlet assembly having a taped, plastered, and painted outer perimeter (peripheral edge) 26 is illustrated in FIG. 6.

Referring now to FIGS. 1-3, according to certain preferred embodiments of the invention, the flush-mounting plate 14 is adapted to interchangeably be connected to a variety of different receptacle types. More particularly, for example, the invention provides that the flush-mounting plate 14 is configured such that, when the flush-mounting plate 14 is attached to an electrical box 16 within a wall, the outlet assembly may be adapted to effectively replace a four-gang outlet receptacle with a two-gang outlet receptacle (or a two-gang outlet receptacle with a one-gang outlet receptacle), without removing the connected flush-mounting plate 14 or damaging and/or repairing the portion of the wall immediately surrounding the flush-mounting plate 14. In other words, when the flush-mounting plate 14 is attached to an electrical box 16 within a wall, the outlet assembly may be easily transitioned to change the number of accessible receptacles 12 from four receptacles to two receptacles—or from two receptacles to one receptacle. By way of illustration, and referring to FIGS. 1-2, the flush-mounting plate 14 may be provided with at least three apertures 32,34,36 located in each of a top portion and a bottom portion of the recessed area 28 of the flush-mounting plate 14. The at least three apertures 32,34,36 are preferably spaced an equal distance apart and, as described above, are adapted to receive a set of screws 20 that connect the receptacle 12 to the flush-mounting plate 14.

The invention provides, for example, that two receptacles 38 (FIG. 2) having two apertures 40,42 located in a top portion thereof and two apertures 44,46 located in a bottom portion thereof may be reversibly connected to the flush-mounting plate 14 vis-à-vis the sets of screws 20 and corresponding apertures located in the recessed area 28 of the flush-mounting plate 14. More particularly, in the case of the two receptacles 38 of FIG. 2, a screw 20 is disposed through each of the apertures 40,42 in the top portion of the two receptacles 38, and each such screw is further disposed into a corresponding left and right aperture 32,36 located in the top portion of the flush-mounting plate 14. Similarly, a screw 20 is disposed through each of the apertures 44,46 in the bottom portion of the two receptacles 38 and each such screw is further disposed into a corresponding left and right aperture 32,36 located in the bottom portion of the flush-mounting plate 14.

In the case of a single receptacle, such as the single receptacle 48 shown in FIG. 1, which includes a single aperture located in a top and bottom portion thereof, a screw 20 may be disposed through the aperture located in the top and bottom portion of the receptacle 48 and further disposed into the center aperture 34 located in the top and bottom portion of the flush-mounting plate 14. As shown in FIG. 2, the center aperture 34 is located between the left and right apertures 32,36 of the top and bottom portions of the flush-mounting plate 14. Accordingly, the flush-mounting plate 14 of the outlet assembly described herein is adapted to interchangeably receive and be connected to either two receptacles 38 (FIG. 2) or a single receptacle 48 (FIG. 1), without having to use a different flush-mounting plate 14—and while the flush-mounting plate 14 is connected to the electrical box 16 within the outer wall.

For example, if two receptacles 38 are originally affixed to the flush-mounting plate 14, the invention provides that one of the two receptacles may be shifted to the right or left (and the other receptacle may be removed), so that the apertures located in the top and bottom portion of the receptacle will correspond and line-up with the center aperture 34 within the flush-mounting plate 14 (instead of the left or right apertures 32,36), as illustrated in FIG. 1. For example, referring to FIG. 2, the receptacle that comprises apertures 42,46 may be shifted to the left, so that instead of corresponding with apertures 36 in the flush-mounting plate 14, apertures 42,46 will correspond with apertures 34 in the center of the flush-mounting plate 14. The receptacle that comprises apertures 40,44 may be removed. The invention further provides that the cover plate 10 that is used to cover the two receptacle 38 shown in FIG. 2, will comprise two separate windows 50 to make the front portion of both receptacles 38 accessible to a user. The invention further provides that the two-window cover plate 10 may be replaced with a cover plate 10 that comprises a single window 52 to make the front portion of the single receptacle 48 of FIG. 1 accessible to a user.

Figure 7:
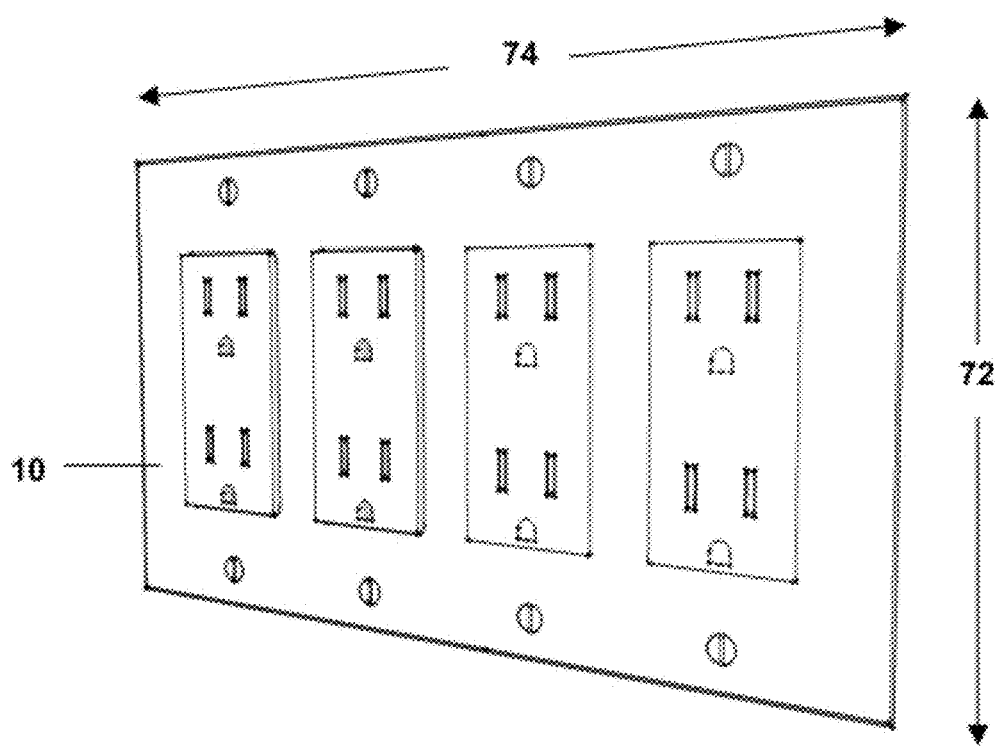
FIG. 7: A perspective, assembled view of the outlet assembly of the present invention, showing a cover plate that exposes four receptacles of a four-gang electrical box.
Figure 8:
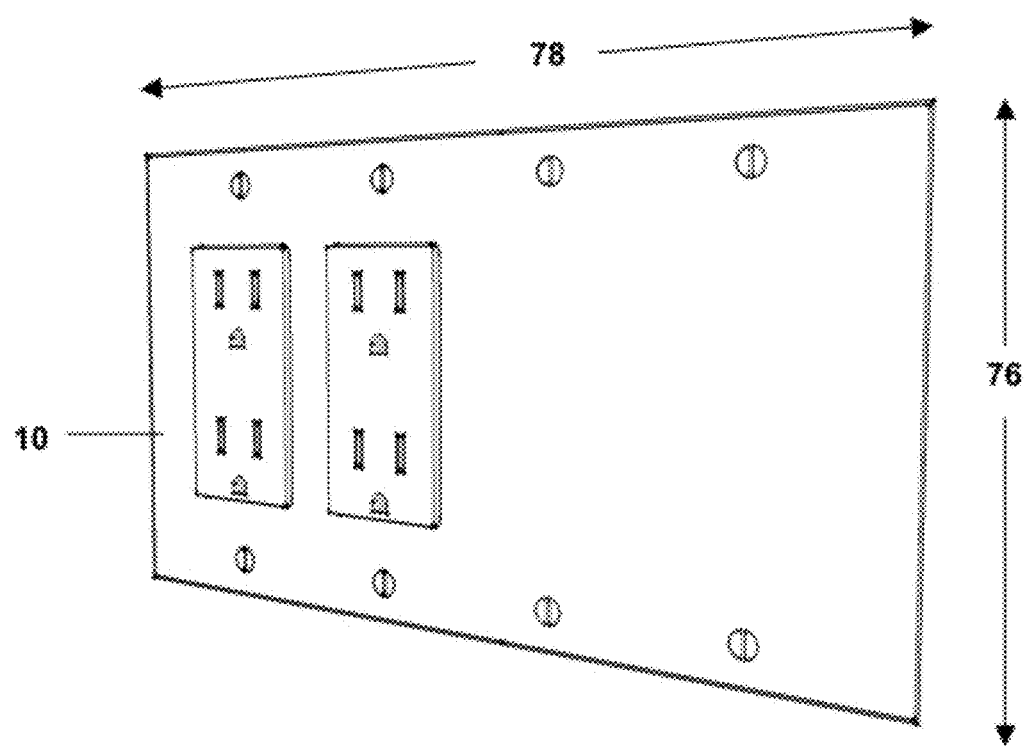
FIG. 8: A perspective, assembled view of the outlet assembly of FIG. 7, showing a cover plate that exposes two receptacles of the four-gang electrical box.

In still other embodiments, instead of disconnecting and removing (and/or moving) a receptacle 12 from the assembly, to reduce the total number of accessible receptacles 12 included in the assembly as described above, the invention provides that different cover plates 10 may be interchangeably used to cover (or reveal) a different number of receptacles 12. For example, referring to FIGS. 7 and 8, a four-gang electrical box 16 (not shown) is affixed to a flush-mounting plate 14 (not shown) that may accommodate four receptacles 12. FIG. 7 shows a cover plate 10 having four windows, such that all four receptacles 12 are accessible to a user. If a user wanted to convert the assembly shown in FIG. 7 into an assembly that makes only two receptacles 12 accessible, a different cover plate 10 may be affixed to the assembly, which includes two windows (to render two of the receptacles accessible to a user) and covers the other two receptacles 12, as illustrated in FIG. 8.

The invention provides that the cover plate 10 that is connected to and covers the two receptacles 38 of FIG. 2 will comprise the same outer dimension (e.g., width and height) as the cover plate 10 that is connected to and covers the single receptacle 48 of FIG. 1, with the only difference between the two cover plates being that the cover plate that is connected to the two receptacles 38 of FIG. 2 will comprise two windows 50 through which the receptacles 38 may be accessed, whereas the cover plate 10 that is connected to and covers the single receptacle 48 of FIG. 1 will comprise a single window 52 through which the receptacle 48 may be accessed. Such design is further shown in FIGS. 7 and 8. As illustrated therein, the cover plate 10 of FIG. 7, which comprises four windows to make four receptacles 12 accessible to a user, has a height 72 and width 74 that is the same as the height 76 and width 78 of the cover plate 10 of FIG. 8, which comprises two windows to make two receptacles 12 accessible to a user.

The invention provides that such design allows a user to effectively replace an outlet assembly that provides access to, for example, two receptacles 38 (FIG. 2) with an assembly that provides access to a single receptacle 48 (FIG. 1), or an assembly which provides access to four receptacles (FIG. 7) with an assembly which provides access to two receptacles (FIG. 8), without removing the flush-mounting plate 14 or damaging or repairing the area of the wall surrounding the electrical box 16. This represents a substantial improvement over the prior art assemblies, which would otherwise require, for example, that the mounting base (e.g., configured for a two-gang electrical box and two receptacles) used in the conventional outlet assembly be removed and replaced with a new mounting base (configured for a single-gang electrical box and one receptacle). Such a procedure with a prior art outlet assembly would further require that the surrounding wall (drywall) be taped, plastered, and painted to repair the damaged sections thereof (or to otherwise fill-in the gaps that would be created in the wall by replacing a two-gang electrical box with a single-gang electrical box).

Although the Figures in the present application show the flush-mounting plate 14 of the device to comprise three apertures 32,34,36 located in the top and bottom portions thereof, the invention provides that a flush-mounting plate 14 of other dimensions may be employed. For example, a larger flush-mounting plate 14 having 4, 5, 6, or more apertures in the top and bottom portions thereof may be employed (which will exhibit a correspondingly greater width to accommodate the additional apertures). As such, the invention provides that the flush-mounting plate 14 described herein may be configured to be connected to, for example, single-gang, two-gang, three-gang, four-gang, five-gang, or six-gang electrical boxes and a corresponding number of receptacles (e.g., outlets, electrical switches, communication and data ports, cable jacks, etc. of varying sizes and numbers). According to such embodiments, as described above, a particular outlet assembly of the present invention could, as desired, be adjusted to provide access to two receptacles (from an assembly that originally provides access to four receptacles), or provide access to four receptacles (from an assembly that originally provides access to six receptacles), or provide access to six receptacles (from an assembly that originally provides access to eight receptacles), and so on. The invention provides, however, that the electrical box 16 should be configured to accommodate (be capable of being connected to) the size of the required flush-mounting plate 14, as described herein, which is necessary to receive the largest type and number of receptacles 12 desired. For example, if it is desired to have a maximum of six receptacles (which may be reduced to four or two receptacles as described herein), the electrical box 16 should be sized and configured to be attached to a flush-mounting plate 14 that will accommodate a maximum of six receptacles.

Device with Magnet-Mounted Faceplate

Referring now to FIGS. 9-19, according to certain additional preferred embodiments of the present invention, a second type of flush-mounting plate 14 device is provided. As in the first embodiment described above, the second type of flush-mounting plate 14 (or, more particularly, the back side thereof) is connected to the electrical box 16. Specifically, the invention provides that the flush-mounting plate 14 may be connected to an electrical box 16 vis-à-vis a set of screws 22, which are disposed through corresponding apertures located in the top and bottom portions of the flush-mounting plate 14 and the electrical box 16. Likewise, similar to the embodiments described above, the invention provides that one or more receptacles 12, for example, may be connected to the flush-mounting plate 14 vis-à-vis a set of screws 20, which are disposed through corresponding apertures located in the top and bottom portions of the receptacle 12 and the flush-mounting plate 14.

Figure 9:
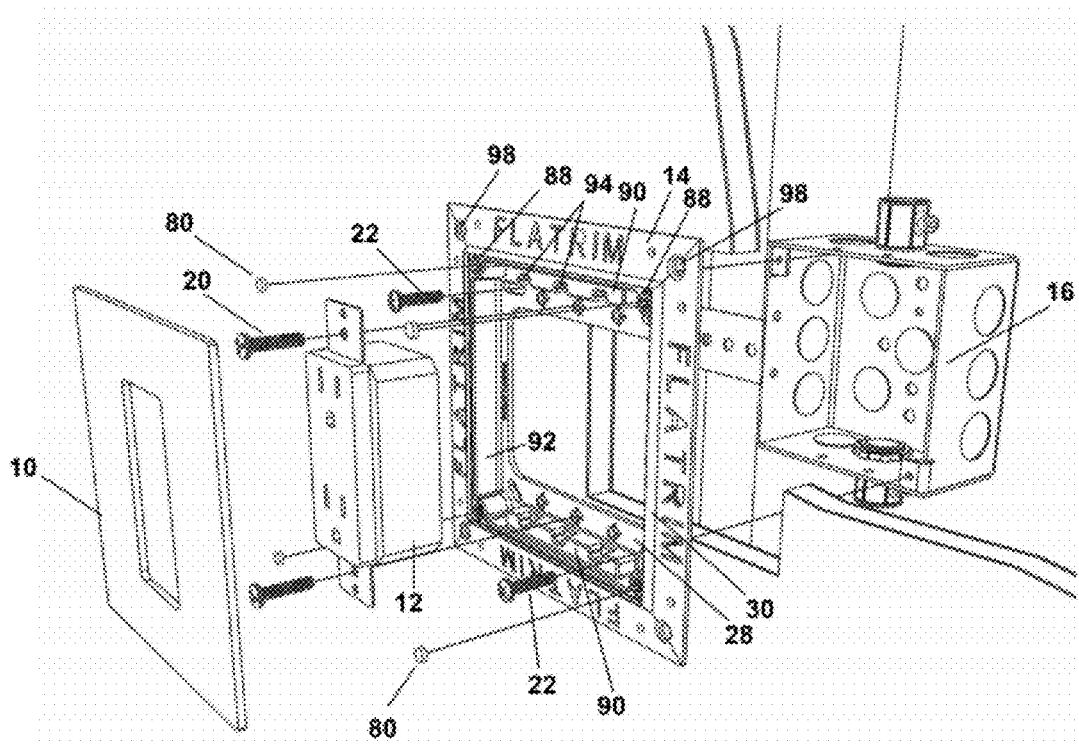
FIG. 9: A perspective, disassembled view of an outlet assembly of the present invention, which shows a single receptacle being attached to another type of flush-mounting plate of the present invention (which employs magnets to connect a cover plate to the flush-mounting plate).
Figure 10:
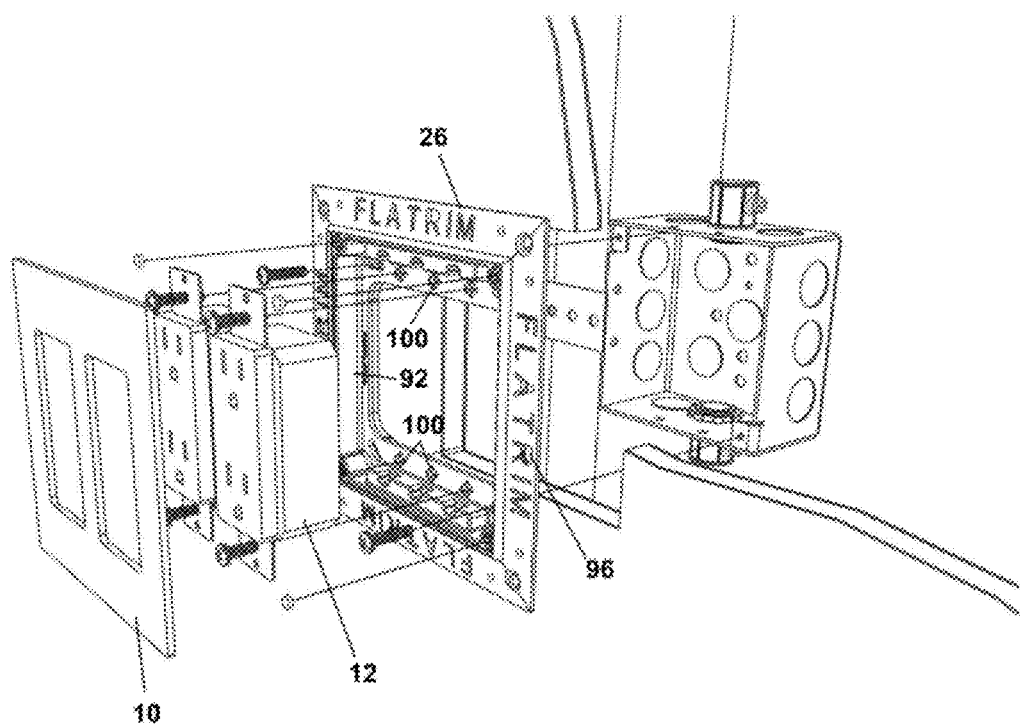
FIG. 10: A perspective, disassembled view of the outlet assembly of FIG. 9, which shows two receptacles being attached to the alternative type of flush-mounting plate shown therein.

Referring to FIGS. 9 and 10, and unlike the embodiments described above, the invention provides that a cover plate 10 may be connected to this second type of flush-mounting plate 14 by a set of magnets 80 (thereby dispensing with the need to attach the cover plate 10 to the flush-mounting plate 14 using screws or other mechanical means). In addition to ease with which the cover plate 10 may be reversibly affixed to the flush-mounting plate 14, such design carries the additional benefit of eliminating the unwanted appearance of screws on the exterior surface of a cover plate 10, e.g., as shown in FIGS. 13, 15, 16, and 17.

The invention provides that a first set of magnets 80 may be disposed in a crushed ribbed setting 88, which comprises a recessed area (surrounded by a plurality of elements that protrude towards the center of the recessed area). Preferably, the crushed ribbed setting 88 recessed areas are configured to receive the magnets 80, such that the magnets 80, when disposed therein, are substantially flush with the surface of the flush-mounting plate 14. The plurality of elements that protrude towards the center of the crushed ribbed setting 88 recessed areas are configured to assist in retaining the magnets disposed therein. The crushed ribbed setting 88 recessed areas may be located at or near the perimeter of the flush-mounting plate 14, such as near the corners of a square-shaped flush-mounting plate 14.

The invention provides that the magnets 80 located in the crushed ribbed setting 88 recessed areas of the flush-mounting plate 14 may be magnetically attracted to the backside of the cover plate 10 due to a corresponding magnet affixed to such backside of the cover plate 10 (FIG. 18), i.e., by way of the magnets having opposite polarities. According to such embodiments, the backside of the cover plate 10 may have its own crushed ribbed setting 106 recessed areas to hold such magnets 80. Alternatively, when the cover plate 10 is comprised of certain types of metallic materials, the magnets 80 located in the crushed ribbed setting 88 recessed areas of the flush-mounting plate 14 may be magnetically attracted to the backside of the cover plate 10 due to the attraction between the magnets 80 and the metallic material from which the cover plate 10 may be manufactured.

Figure 11:
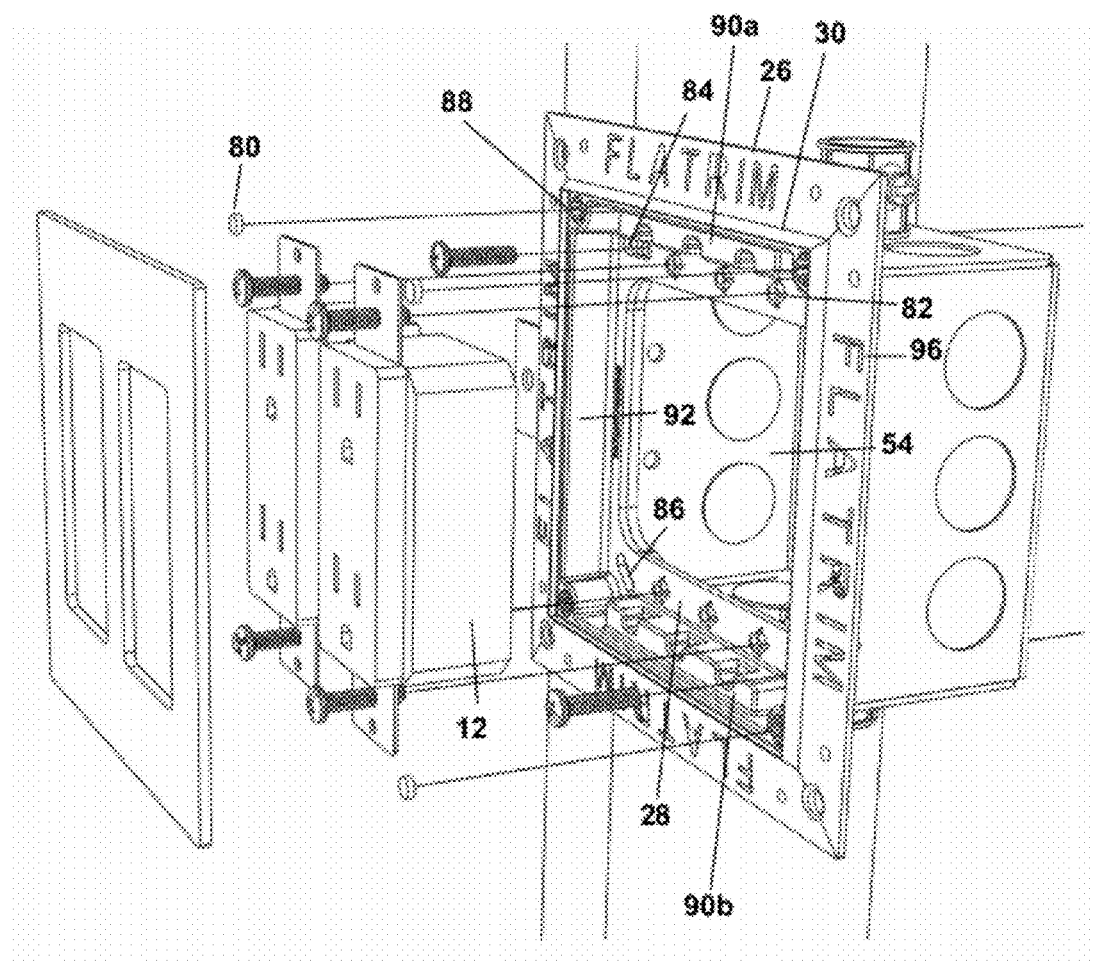
FIG. 11: Another perspective view of the outlet assembly and flush-mounting plate of FIG. 10, which shows the flush-mounting plate connected to an underlying electrical box.
Figure 12:
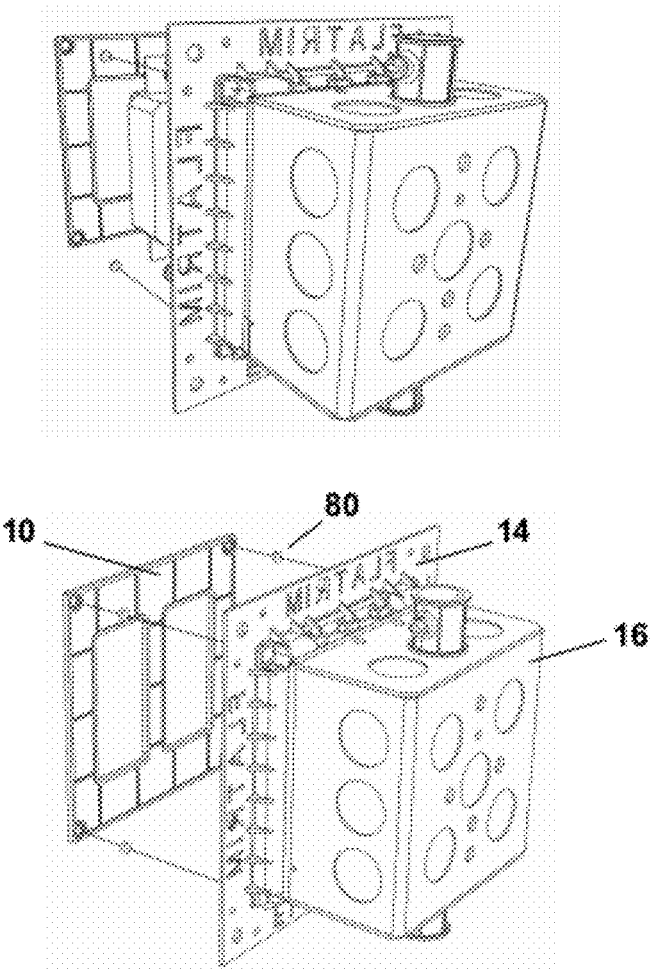
FIG. 12: A backside view of the outlet assembly and flush-mounting plate of FIG. 11.
Figure 13:
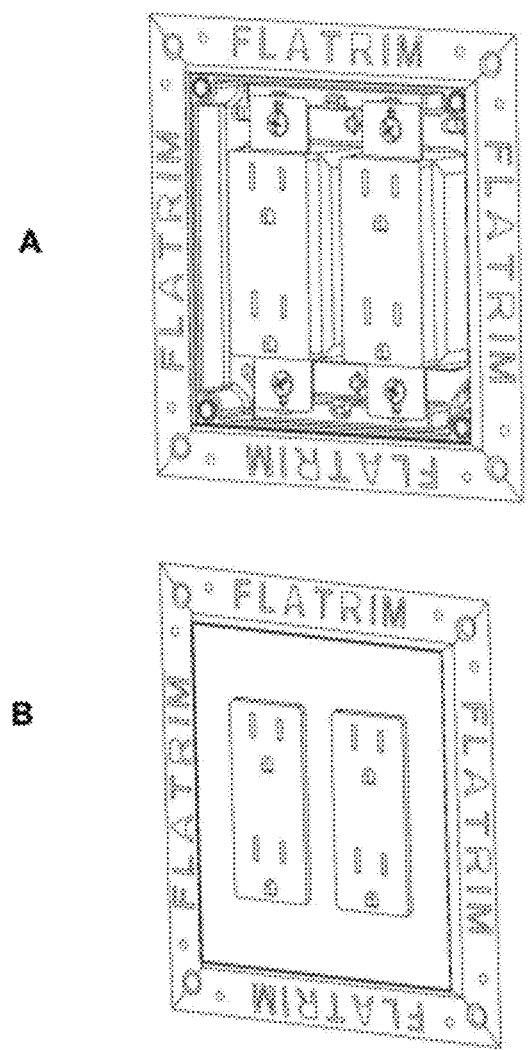
FIG. 13: A: A front, assembled view of the outlet assembly and flush-mounting plate of FIG. 10, without the cover plate. B: A front, assembled view of the outlet assembly and flush-mounting plate of FIG. 10, with the cover plate.
Figure 14:
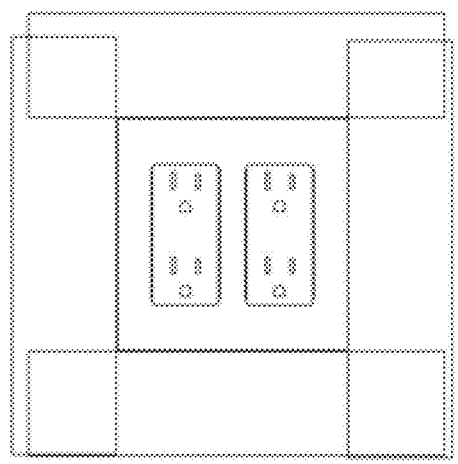
FIG. 14: A front, assembled view of the outlet assembly and flush-mounting plate of FIG. 13B, with the perimeter portion thereof covered in drywall tape.
Figure 15:
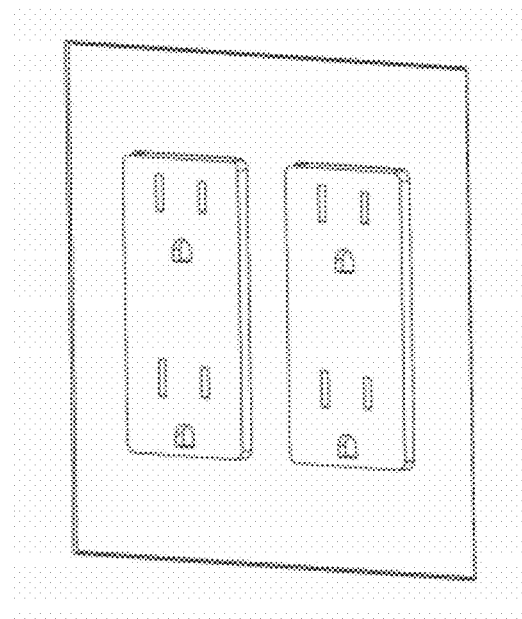
FIG. 15: A front, assembled view of the outlet assembly and flush-mounting plate of FIG. 13B, with the perimeter portion thereof covered in drywall tape, plastered, and painted.
Figure 16:
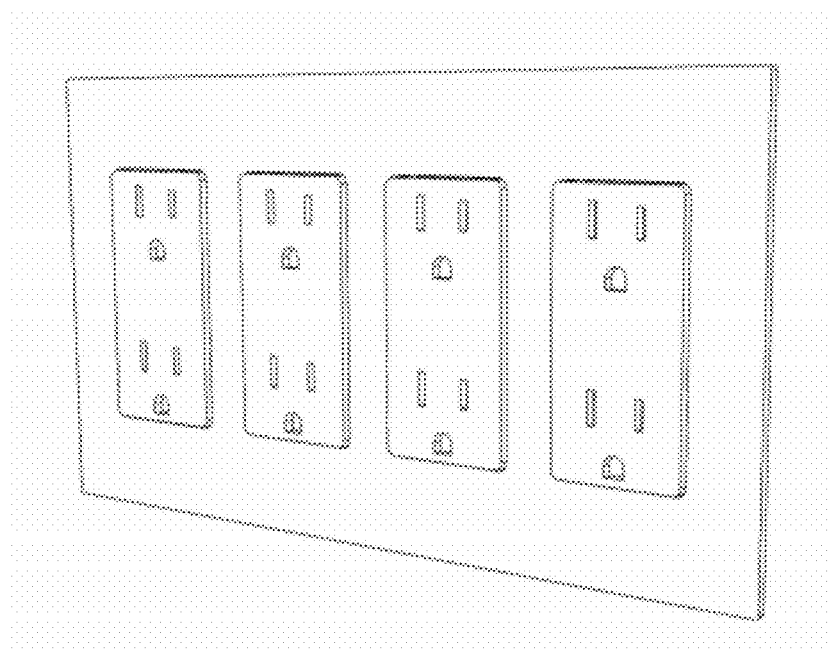
FIG. 16: A perspective, assembled view of an outlet assembly of the present invention which uses the alternative type of flush-mounting plate shown in FIG. 10, with the cover plate exposing four receptacles of a four-gang electrical box.
Figure 17:
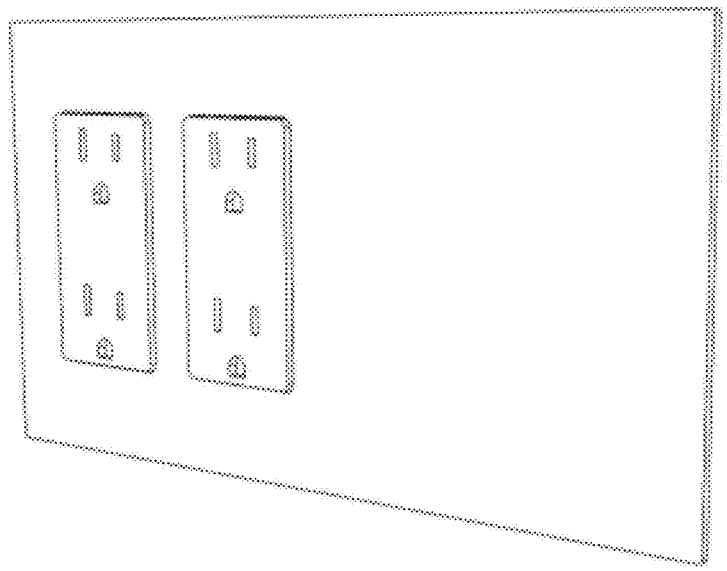
FIG. 17: A perspective, assembled view of an outlet assembly of the present invention which uses the alternative type of flush-mounting plate shown in FIG. 10, with the cover plate exposing two receptacles of a four-gang electrical box.
Figure 18:
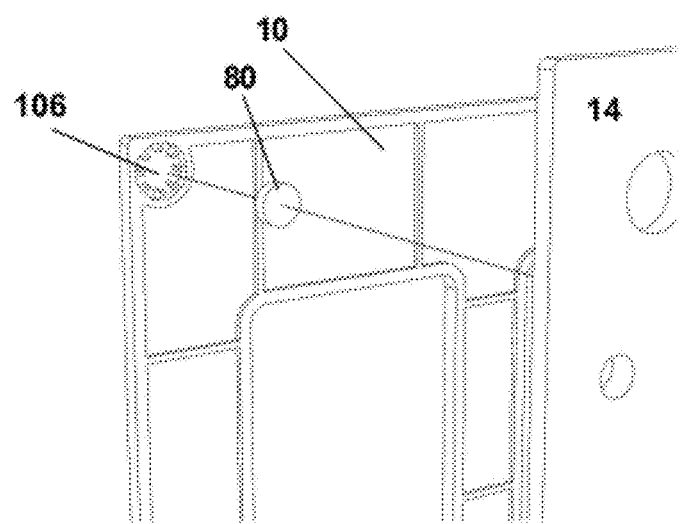
FIG. 18: A perspective backside view of a cover plate and a magnet that may be used to reversibly attach the cover plate to a flush-mounting plate.

Importantly, the second type of flush-mounting plate 14 of the present invention comprises a mounting rim 90 or, more specifically, a set of mounting rims 90 (with one located near the top of the flush-mounting plate 14, and the other located near the bottom of the flush-mounting plate 14). The mounting rim 90 allows the flush-mounting plate 14 to be mounted through mechanical means (such as through a set of screws as described above) or through magnetic means (such as through a set of magnets). The mounting rim 90 comprises a box-shaped element, which resides on the recessed area 28 of the flush-mounting plate 14. According to these embodiments, the recessed area 28 of the flush-mounting plate 14 is surrounded by a wall 92, such that the top edge of the wall 92 meets the inner edge portion 30 of the outer perimeter 26 of the flush-mounting plate 14. According to certain preferred embodiments, a first mounting rim 90*a* is integrally formed with the top wall 92 and top side of the recessed area 28 of the flush-mounting plate 14, whereas a second mounting rim 90*b* is integrally formed with the bottom wall 92 and bottom side of the recessed area 28 of the flush-mounting plate 14 (FIG. 11). The mounting rims 90 will extend outward from the recessed area 28, but stop short of the inner edge portion 30 of the outer perimeter 26 (i.e., the surface of the mounting rim 90 that faces, for example, a receptacle 12 will be recessed relative to the inner edge portion 30 of the outer perimeter 26 of the flush-mounting plate 14). According to still further preferred embodiments, the mounting rims 90 will preferably comprise a series of cavities 94, which are adapted to provide clearance for screws (when the flush-mounting plate 14 is mounted with screws).

The invention provides that the area between the inner edge portion 30 and the outer perimeter 26 may be provided with certain apertures 96 or, as in the case of FIGS. 9-13, a word or other insignia 96 (provided that such cut-out words/insignia allow a fluid to travel from one side of the flush-mounting plate 14 to the other). The invention provides that such apertures 96 (or word or other insignia 96) will allow drywall spackle to create a bond between the flush-mounting plate 14 and the underlying dry wall. In addition, the flush-mounting plate 14 plate of such embodiments may comprise a set of apertures 98, preferably located near the corners of the flush-mounting plate 14, which may receive a dry wall screw to further attach the flush-mounting plate 14 plate to the dry wall (and to further encourage a flush, or substantially flush, seam between the flush-mounting plate 14 plate and the dry wall). Still further, the recessed area 28 of the flush-mounting plate 14 may comprise a series of cross supports 100, which provide enhanced screw-device mounting support.

As in the embodiments described above, the invention provides that the apertures located in the top and bottom portions of the flush-mounting plate 14, which are used to attach the flush-mounting plate 14 to the electrical box 16, will preferably comprise an area that may allow the orientation of the flush-mounting plate 14 to be adjusted, before the flush-mounting plate 14 is secured to the electrical box 16 using the screws 22 described herein. For example, referring to FIG. 11, the aperture 84 located in the top portion of the flush-mounting plate 14 exhibits a column (area) running perpendicular to the side of the flush-mounting plate 14, whereas the aperture 86 located in the bottom portion of the flush-mounting plate 14 is a slanted column (area), relative to the sides of the flush-mounting plate 14. This configuration allows the flush-mounting plate 14 to be slightly turned left or right, until the topside of the flush-mounting plate 14 is desirably level, while still allowing the apertures 84,86 located in the top and bottom portions of the flush-mounting plate 14 to correspond with, and be connected to, the apertures located in the electrical box 16.

As in the other preferred embodiments described above, the cover plate 10, one or more receptacles 12 (or other devices), and flush-mounting plate 14 are installed into the electrical box 16 such that the exterior surface of the cover plate 10 is preferably flush (or substantially flush) with the outer wall 24 that surrounds the electrical box 16. In addition, as with the embodiment described above, the second type of flush-mounting plate 14 may be connected to various types of devices other than electrical outlets, such as switches, communication and data ports (e.g., for telephone and cable lines), thermostats, LCD screens, and other types of receptacles and low-voltage devices. Still further, another advantage of such embodiments (as described above) is that the flush-mounting plate 14 may accommodate various types of receptacles. More particularly, for example, the invention provides that the flush-mounting plate 14 is configured such that, when the flush-mounting plate 14 is attached to an electrical box 16 within a wall, the outlet assembly may be adapted to effectively replace a four-gang outlet receptacle with a two-gang outlet receptacle (or a two-gang outlet receptacle with a one-gang outlet receptacle), without removing the connected flush-mounting plate 14 or damaging and/or repairing the portion of the wall immediately surrounding the flush-mounting plate 14. In other words, when the flush-mounting plate 14 is attached to an electrical box 16 within a wall, the outlet assembly may be easily transitioned to change the number of accessible receptacles 12 from four receptacles to two receptacles—or from two receptacles to one receptacle.

Figure 19:
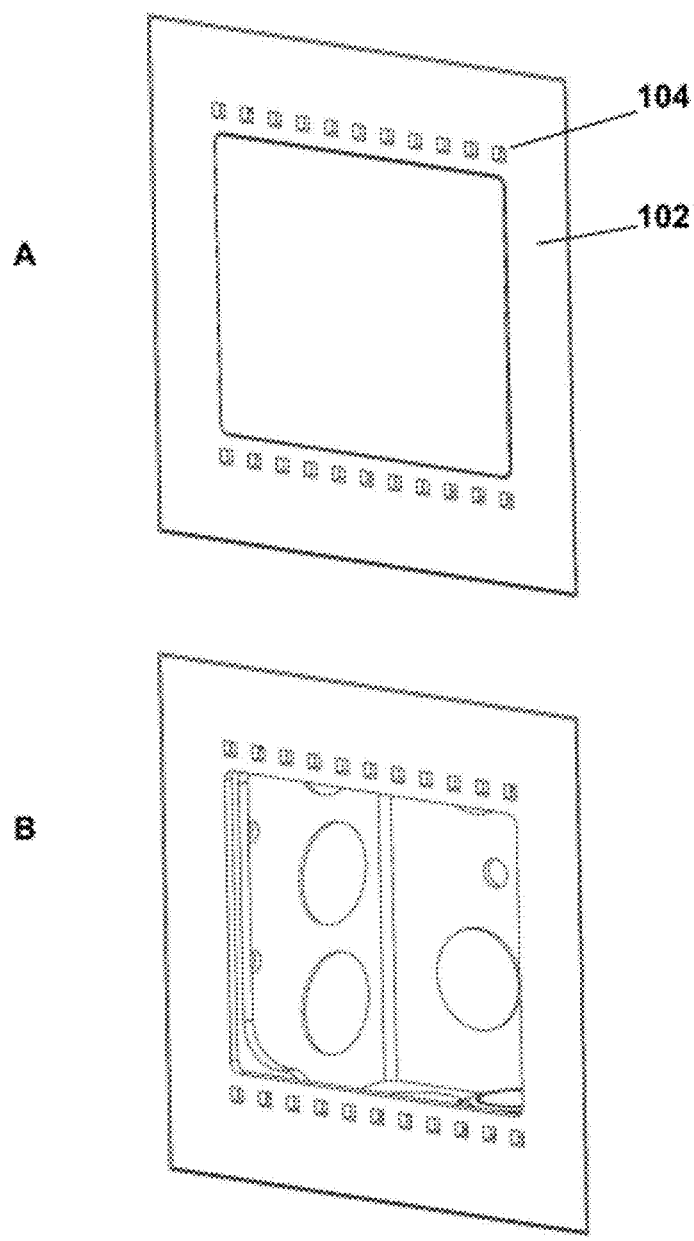
FIG. 19: A: An illustration of another flush-mounting plate of the present invention, to which a variety of low-voltage devices may be connected. B: An illustration of the flush-mounting plate shown in FIG. 19A, attached to an electrical box.

Referring now to FIG. 19, the invention further encompasses an additional type of flush-mounting plate 102, which may be connected to an electrical box 16 as described above. According to such embodiments, however, the flush-mounting plate 102 may comprise a plurality of apertures 104, which are adapted to receive and facilitate a connection to any of a variety of low-voltage devices, such as communication and data ports, LCD screens, thermostats, and other devices.

According to other related embodiments of the invention, methods for installing the outlet assemblies (or switch or low-voltage device assemblies) described herein, in a wall are provided. More particularly, such methods comprise the steps of cutting a hole 56 in a wall that exhibits approximately the same outer dimension as the outer dimension of the flush-mounting plate described herein. The methods further include connecting the flush-mounting plate described herein to an electrical box, and then connecting the cover plate (which preferably exhibits a planar exterior surface) and a receptacle (or other assembly) to the flush-mounting plate. As explained above, the cover plate, receptacle, and flush-mounting plate are preferably installed into the electrical box in such a manner that the exterior surface of the cover plate is flush with an outer surface of the wall that surrounds the electrical box.

Still further, although the Figures in the present application show the flush-mounting plate 14 device to comprise a rectangular (or square) outer dimension, the invention provides that the flush-mounting plate 14 may be configured to exhibit other regular and irregular outer dimensions, provided that the outer dimension of the cover plate is configured in a similar manner. The outlet assemblies described herein, and the components thereof (such as the cover plate 10, receptacle 12, flush-mounting plate 14, and electrical box 16), may be comprised of any suitable material, such as plastic, wood, steel, alloys, or combinations thereof. For example, the cover plate 10 may be comprised of wood, steel, brass, copper, or other aesthetically desirable materials; the receptacle 12 may be comprised of a combination of metal and plastic; and the flush-mounting plate 14 and electrical box 16 may be comprised of plastic, steel, or other suitable materials.

There are many benefits to the present invention. For example, existing conventional prior art outlet assemblies may be replaced (retrofitted) with the outlet assemblies of the present invention, such that the planar surface of the cover plate will be flush with the outer wall—creating a unique and desirable appearance (which may, optionally, be further enhanced by taping, plastering, and painting the seam or transition point between the cover plate and outer wall). Such design will also mitigate the risk of damage to the cover plate, which otherwise may occur with a conventional cover plate that protrudes away from the wall surface. In addition, the flush-mounting plate component described herein allows a receptacle and cover plate to be installed into a wall such that the top edge thereof is level, even if the associated electrical box is not level (which is often the case).

Still further, the invention provides that the methods of installing the outlet assemblies of the present invention will allow an electrical inspector to conduct an inspection of the wires and electrical box, even after the surround wall has been erected. In the prior art assemblies, the so-called "mounting base" which is typically used to mount electrical devices to an electrical box does not allow sufficient access to the interior of the electrical box—without damaging the surrounding dry wall—to permit an adequate electrical inspection. As such, when a home is newly constructed, electrical inspections must be performed before the drywall is erected, which often leads to construction delays. Because the flush-mounting plate component described above may be easily removed from an electrical box, the outlet assembly described herein allows full access to the interior electrical components, without major repair or damage to surrounding drywall, such that inspections may take place even after the drywall has been erected.

The many aspects and benefits of the invention are apparent from the detailed description, and thus, it is intended for the following claims to cover all such aspects and benefits of the invention which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A flush-mounting plate that is adapted to interchangeably receive one or more receptacles, switches, or low-voltage devices, while being connected to an electrical box that is disposed inside of a wall, wherein the flush-mounting plate comprises:
   (a) a back side that is adapted to be connected to the electrical box through a set of screws disposed through corresponding apertures located in the flush-mounting plate and electrical box;
   (b) a front side that is adapted to be connected to the one or more receptacles and a cover plate having a planar exterior surface, whereby the one or more receptacles, switches, or low-voltage devices are positioned between the flush-mounting plate and the cover plate, wherein:
      (i) the cover plate, one or more receptacles, switches, or low-voltage devices, and flush-mounting plate are connected to the electrical box, such that the exterior surface of the cover plate is substantially flush with an outer wall that surrounds the electrical box;
      (ii) the cover plate is connected to the flush-mounting plate through a set of magnets or mechanical attachment means;
      (iii) the flush-mountinq plate exhibits a square-shaped outer perimeter, wherein a wall connects the outer perimeter to a recessed area of the flush-mounting plate, with a top edge of the wall meeting an inner edge portion of the outer perimeter, wherein a top side and bottom side of the recessed area each comprise a mounting rim that is adapted to receive and be connected to the one or more receptacles, switches, or low-voltage devices; and
      (iv) the outer perimeter of the flush-mounting plate is tapered, wherein a transition point between the outer perimeter and the outer wall is adapted to be covered with tape, plaster, paint, or a combination thereof.

2. The flush-mounting plate of claim 1, wherein the recessed area of the flush-mounting plate comprises at least three apertures located in each of a top portion and a bottom portion thereof, wherein the at least three apertures are spaced an equal distance apart and are adapted to receive a set of screws that connect the one or more receptacles to the flush-mounting plate.

3. The flush-mounting plate of claim 2, wherein each mounting rim comprises a series of cavities that are configured to provide clearance for screws.

4. The flush-mounting plate of claim 3, wherein the flush-mounting plate is adapted to interchangeably receive and be connected to:
   (a) a set of two receptacles having two apertures located in a top portion thereof and two apertures located in a bottom portion thereof, wherein (i) a screw is disposed through each of the apertures in the top portion of the set of two receptacles, and each such screw is further disposed into a corresponding left and right aperture located in the top portion of the flush-mounting plate and (ii) a screw is disposed through each of the apertures in the bottom portion of the set of two receptacles and each such screw is further disposed into a corresponding left and right aperture located in the bottom portion of the flush-mounting plate; or
   (b) a single receptacle having a single aperture located in a top portion thereof and a single aperture located in a bottom portion thereof, wherein (i) a screw is disposed through the aperture located in the top portion of the single receptacle and further disposed into a center aperture located in the top portion of the flush-mounting plate, which is located between the left and right aperture of the top portion of the flush-mounting plate and (ii) a screw is disposed through the aperture located in the bottom portion of the single receptacle and further disposed into a center aperture located in the bottom portion of the flush-mounting plate, which is located between the left and right aperture of the bottom portion of the flush-mounting plate.

5. The flush-mounting plate of claim 4, wherein the flush-mounting plate is adapted to interchangeably receive and be connected to the set of two receptacles or single receptacle while the flush-mounting plate is connected to the electrical box within the outer wall.

6. The flush-mounting plate of claim 1, wherein the mechanical means are selected from the group consisting of screws, tabs, pegs, snaps, and adhesives.

7. The flush-mounting plate of claim 1, wherein when the cover plate, one or more receptacles, switches, or low-voltage devices, and flush-mounting plate are connected to the electrical box, the exterior surface of the cover plate does not protrude from, and is not recessed relative to, a plane of the outer wall by more than a distance of $3/32$ of an inch.

8. The flush-mounting plate of claim 1, wherein when the cover plate, one or more receptacles, switches, or low-voltage devices, and flush-mounting plate are connected to the electrical box, the exterior surface of the cover plate does not protrude from, and is not recessed relative to, a plane of the outer wall by more than a distance of $1/16$ of an inch.

9. The flush-mounting plate of claim 7, wherein the mechanical means are selected from the group consisting of screws, tabs, pegs, snaps, and adhesives.

10. The flush-mounting plate of claim 1, wherein the electrical box that is disposed inside of the wall is a 1900 box.

* * * * *